US008402704B2

(12) United States Patent
Hartley et al.

(10) Patent No.: US 8,402,704 B2
(45) Date of Patent: Mar. 26, 2013

(54) SOLAR POWER STRUCTURE AND KIT FOR MAKING THE SAME

(75) Inventors: Philippe Hartley, La Cañada, CA (US); Nicholas Brady Tucker, La Cañada, CA (US)

(73) Assignee: Phat Energy Corporation, La Crescenta, CA (US)

( * ) Notice: Subject to any disclaimer, the term of this patent is extended or adjusted under 35 U.S.C. 154(b) by 0 days.

(21) Appl. No.: 12/911,728

(22) Filed: Oct. 26, 2010

(65) Prior Publication Data

US 2011/0094569 A1    Apr. 28, 2011

Related U.S. Application Data

(60) Provisional application No. 61/279,942, filed on Oct. 27, 2009.

(51) Int. Cl.
  *E04D 13/03*    (2006.01)
  *H01L 31/042*   (2006.01)
  *H01J 5/16*     (2006.01)

(52) U.S. Cl. ............... 52/173.3; 52/73; 52/74; 52/222; 136/245; 136/251; 136/244

(58) Field of Classification Search ............... 52/173.3, 52/222, 73, 74, 58, 62; 136/244, 246, 245, 136/251, 291; 126/623, 704
See application file for complete search history.

(56) References Cited

U.S. PATENT DOCUMENTS

| | | | | |
|---|---|---|---|---|
| 3,090,162 A * | 5/1963 | Baroni | ............................ | 52/80.2 |
| 3,131,792 A * | 5/1964 | Groneman et al. | ................ | 52/38 |
| 3,200,554 A * | 8/1965 | Goodman et al. | ............... | 52/832 |
| 3,583,115 A * | 6/1971 | Colmenares | ..................... | 52/222 |
| 4,067,656 A * | 1/1978 | Dennis | .......................... | 403/296 |
| 4,100,703 A * | 7/1978 | Sickler | .............................. | 52/16 |
| 4,170,425 A * | 10/1979 | Brown | ......................... | 403/296 |
| 4,261,143 A * | 4/1981 | Rizzo | ................................ | 52/16 |
| 4,269,173 A * | 5/1981 | Krueger et al. | ............... | 126/634 |
| 4,924,651 A * | 5/1990 | Plant | .......................... | 52/745.13 |
| 4,966,631 A * | 10/1990 | Matlin et al. | ................... | 136/244 |
| 5,125,608 A * | 6/1992 | McMaster et al. | ......... | 248/163.1 |
| 5,568,709 A * | 10/1996 | Steckler | ....................... | 52/309.8 |
| 5,660,005 A * | 8/1997 | Tacoma | ......................... | 52/93.2 |
| 6,111,189 A | 8/2000 | Garvision et al. | | |
| 6,591,570 B2 * | 7/2003 | Miller, Jr. | ....................... | 52/632 |
| 6,672,018 B2 | 1/2004 | Shingleton | | |
| 6,799,398 B1 * | 10/2004 | Plevyak | ....................... | 52/173.3 |
| 7,081,585 B2 | 7/2006 | Oak | | |
| 7,237,360 B2 | 7/2007 | Moncho et al. | | |
| D560,605 S | 1/2008 | McClintock et al. | | |
| 7,531,741 B1 | 5/2009 | Melton et al. | | |
| 7,793,467 B1 * | 9/2010 | Melton et al. | ................... | 52/79.1 |

(Continued)

FOREIGN PATENT DOCUMENTS

WO    2009043894 A1    4/2009

OTHER PUBLICATIONS

Kyocera Solar Grove, accessed at http://envisionsolar.com/downloads/Kyocera_Solar_Grove.pdf, Published as early as Oct. 13, 2009, Publisher: Envision Solar, San Diego, CA, US.

*Primary Examiner* — Phi A

(74) *Attorney, Agent, or Firm* — Stone Creek Services LLC; Alan M Flum

(57) ABSTRACT

A strong, aesthetically pleasing solar power structure comprising a hollow-beam frame, a plurality of photovoltaic panels, a sub-assembly for holding the PV panels, and a plurality of columns is provided. Also provided is a kit for making such a structure.

18 Claims, 24 Drawing Sheets

U.S. PATENT DOCUMENTS

| | | |
|---|---|---|
| 8,051,868 B2 * | 11/2011 | Whitlow ........................ 135/123 |
| 2002/0189662 A1 | 12/2002 | Lomparski |
| 2004/0084078 A1 | 5/2004 | Yoshida et al. |
| 2005/0241246 A1 | 11/2005 | Sinha et al. |
| 2007/0044830 A1 | 3/2007 | Uemura |
| 2008/0230108 A1 * | 9/2008 | Keshner et al. ............... 136/244 |
| 2009/0050194 A1 | 2/2009 | Noble et al. |
| 2009/0223142 A1 | 9/2009 | Shingleton et al. |
| 2010/0175741 A1 * | 7/2010 | Thorne .......................... 136/251 |
| 2010/0205870 A1 * | 8/2010 | Cobb ............................ 52/79.1 |
| 2010/0275975 A1 * | 11/2010 | Monschke et al. ............ 136/251 |
| 2010/0281794 A1 | 11/2010 | Saillard |

* cited by examiner

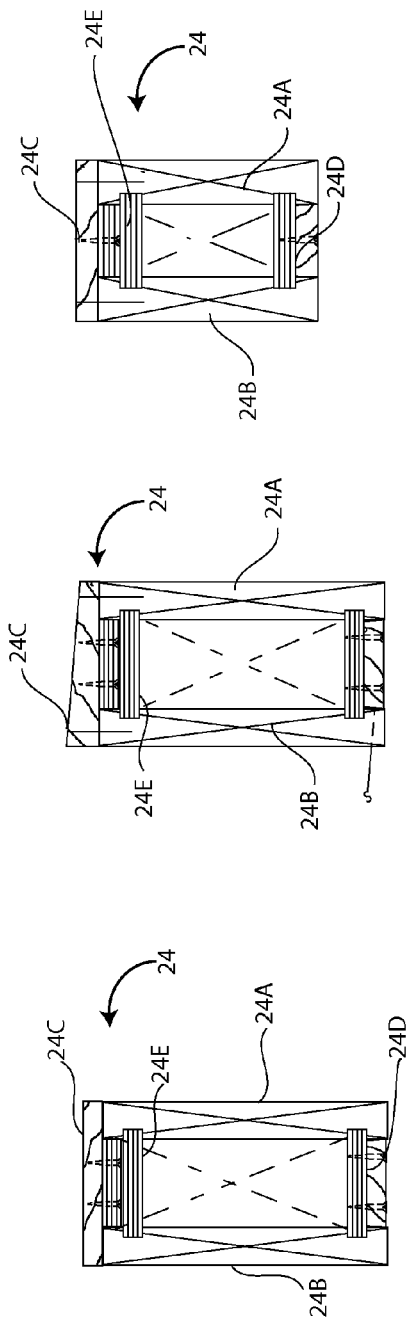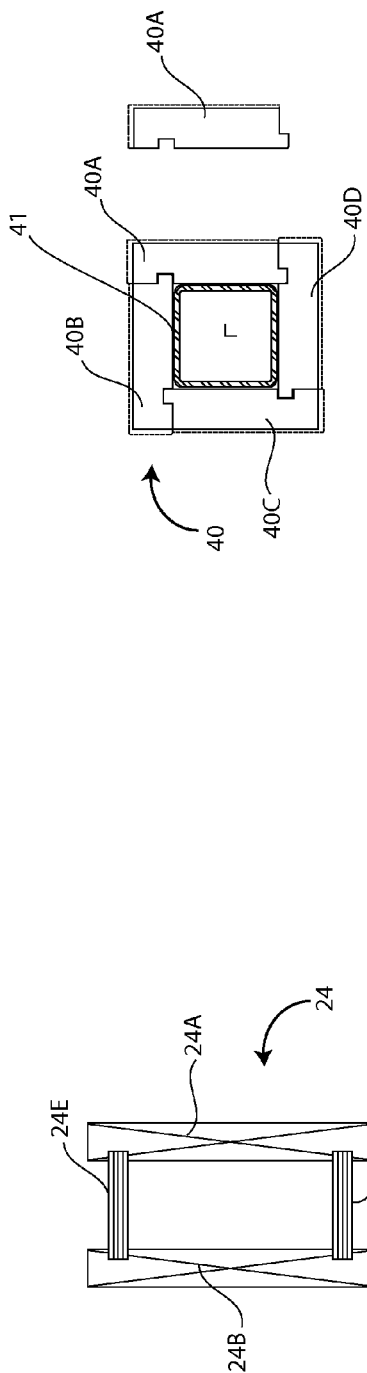

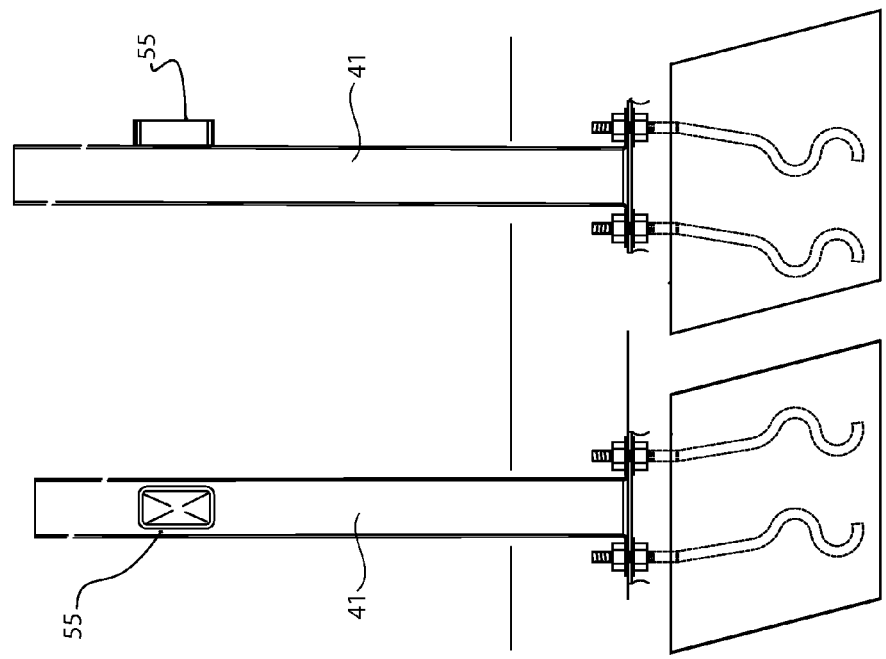
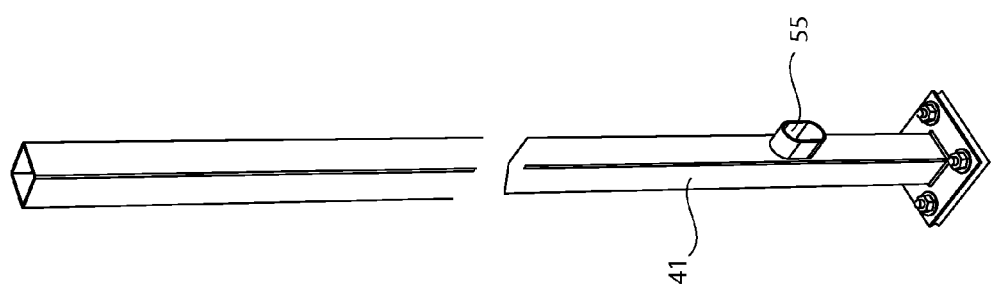
FIG. 18

US 8,402,704 B2

SOLAR POWER STRUCTURE AND KIT FOR MAKING THE SAME

This application claims benefit to U.S. Provisional Application No. 61/279,942 filed on Oct. 27, 2009. The entire contents of U.S. Provisional Application No. 61/279,942 are hereby incorporated by reference.

FIELD OF INVENTION

The invention relates generally to a photovoltaic panel power system and supporting structure, and a kit for making such a structure that is particularly suitable for use as a carport, patio cover, and in other residential and small commercial open spaces.

BACKGROUND

As a "green" energy form, solar power has attracted substantial interest in recent years. Photovoltaic (PV) panels are now used to convert sunlight into electricity on residential and commercial rooftops and some free-standing structures. PV power generation is now financially viable and has broad environmental appeal. Still, a need exists for a solar power structure that is strong, easy to build, durable, weather resistant, aesthetically pleasing, and suitable for use in residential and small commercial settings. The present invention addresses this need.

SUMMARY

In one aspect, the invention provides a solar power structure comprising a strong, aesthetically pleasing frame, a plurality of support columns, two or more translucent PV panels, and a generally water resistant sub-assembly that supports the PV panels. In another aspect, the invention provides a kit comprising the necessary materials for making such a structure, e.g., framing, connecting joints, PV panels, cladding, flashing, fasteners, etc. The electrical wires and connections associated with solar power generation are hidden within the frame, which is both strong and lightweight. The structure can be used as (e.g.) a patio cover, carport, or similar structure, and has a highly aesthetic appearance, both from a distance and when viewed up front, and even from underneath it. It can be built as a lean-to or a free-standing structure.

The solar power structure has a strong wood and metal frame, with internal metal (e.g., steel) connectors sheathed by aesthetically appealing, external hollow wood beams. Advantageously, the structure utilizes a unique water-resistant cladding that protects the PV panels and electrical conduits and connections.

DRAWINGS

These and other features, aspects, and advantages of the present invention will become better understood with regard to the following description, appended claims, and accompanying drawings where:

Figure 7:
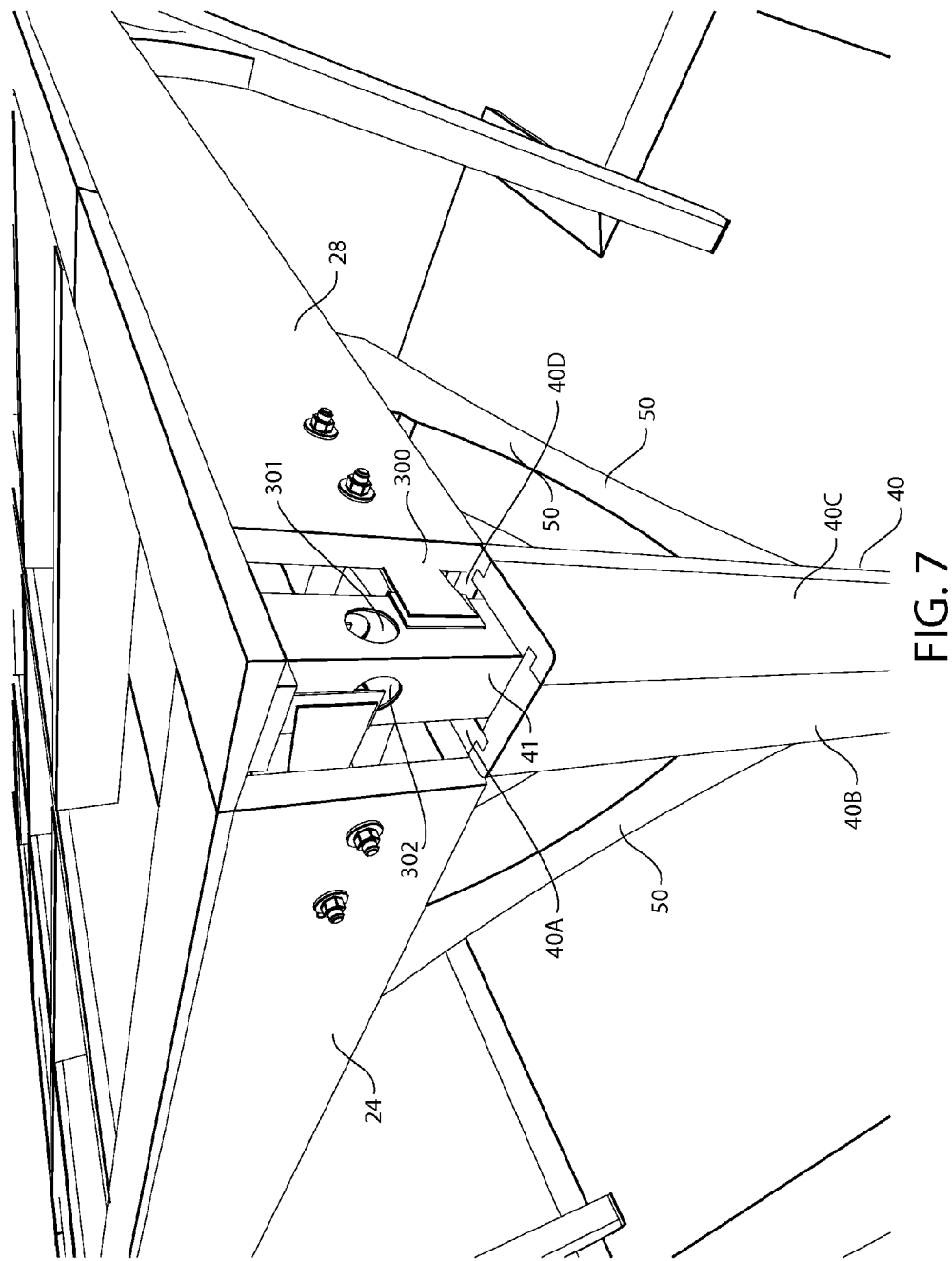
FIG. 7 shows a partial view of an embodiment in accordance with the invention including hollow columns.
Figure 8A:
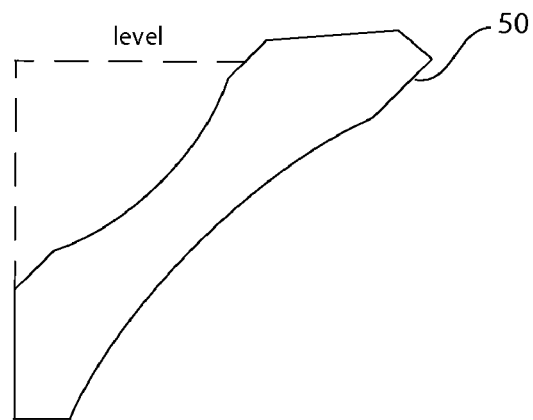
Figure 8B:
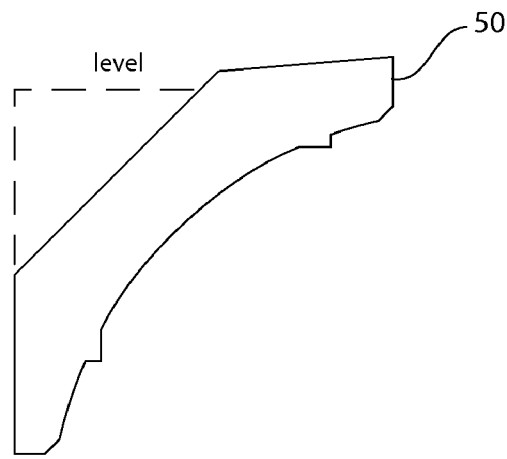
Figure 8C:
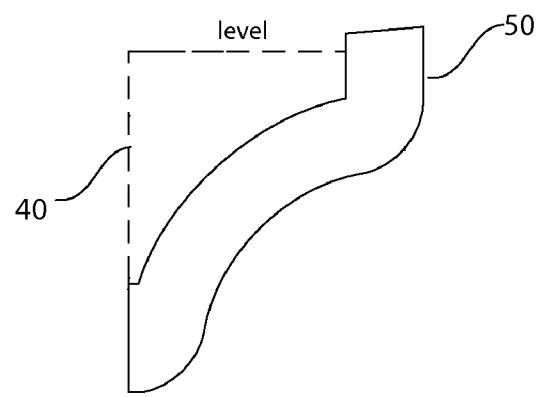
Figure 9C:
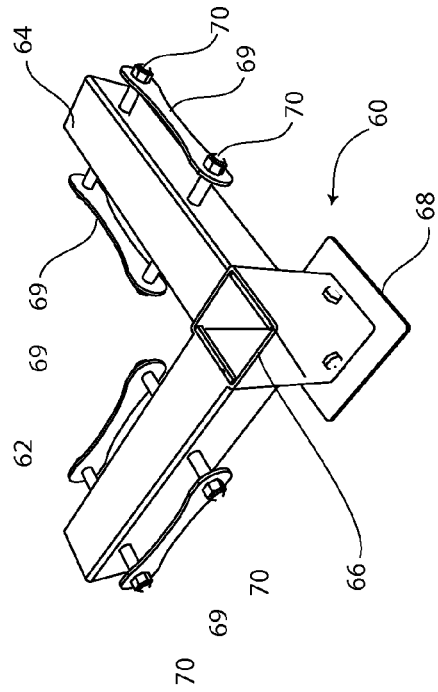
Figure 9A:
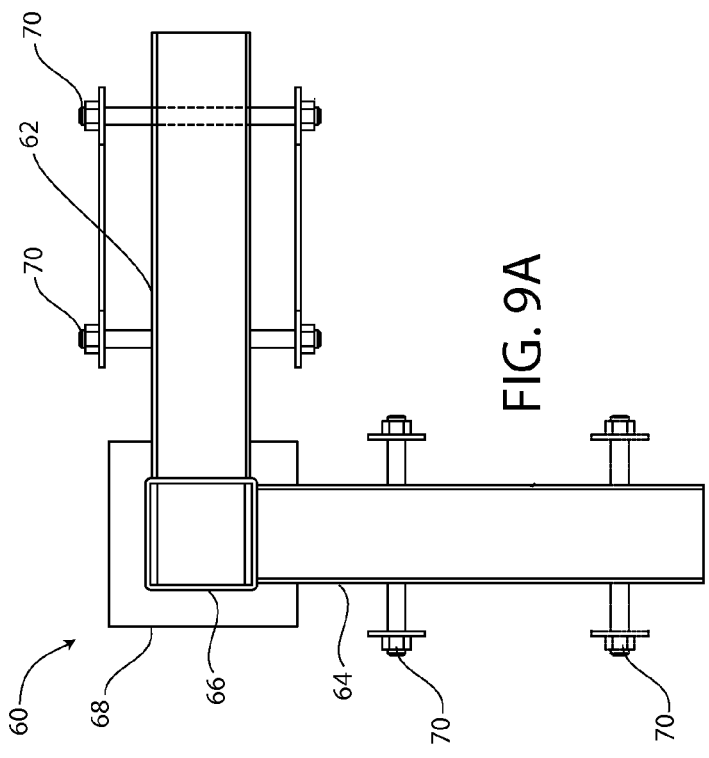
Figure 9B:
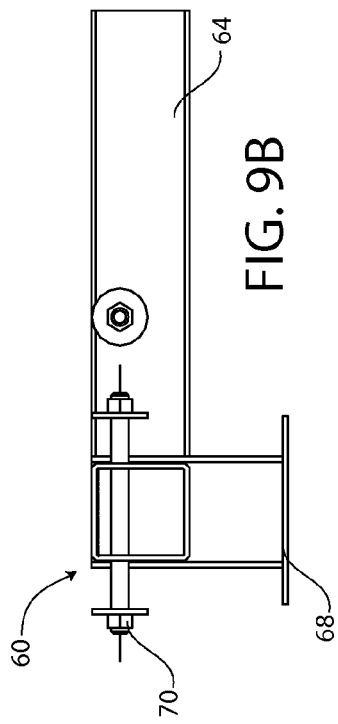
Figure 10C:
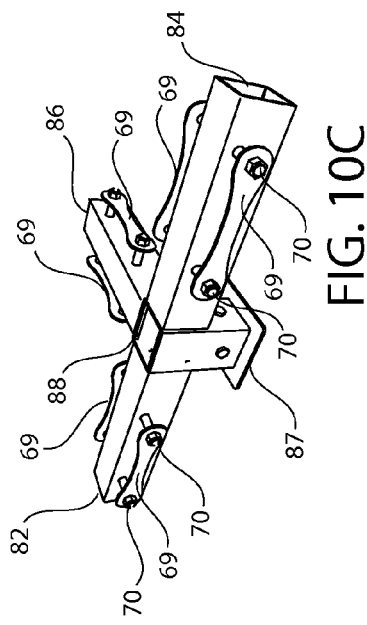
Figure 10D:
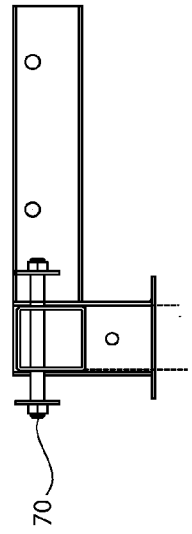
Figure 10A:
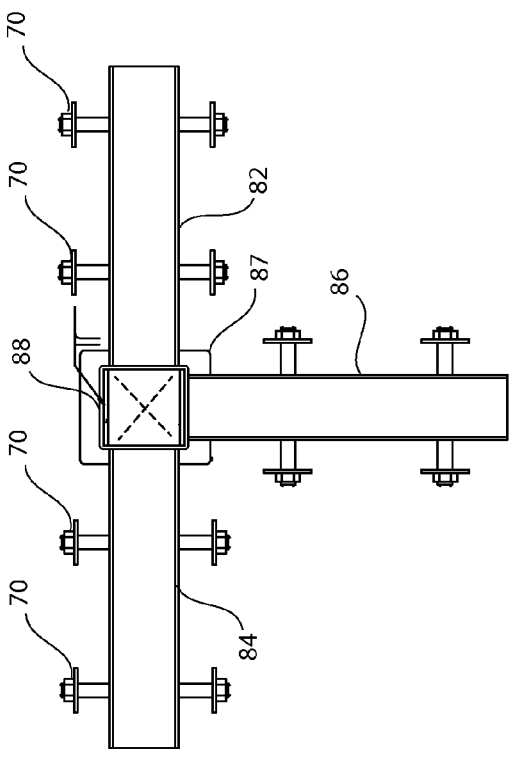
Figure 10B:
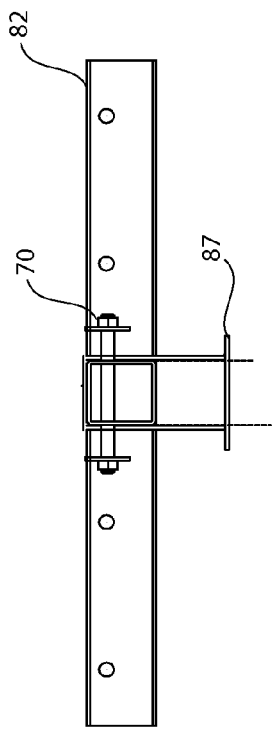
Figure 11:
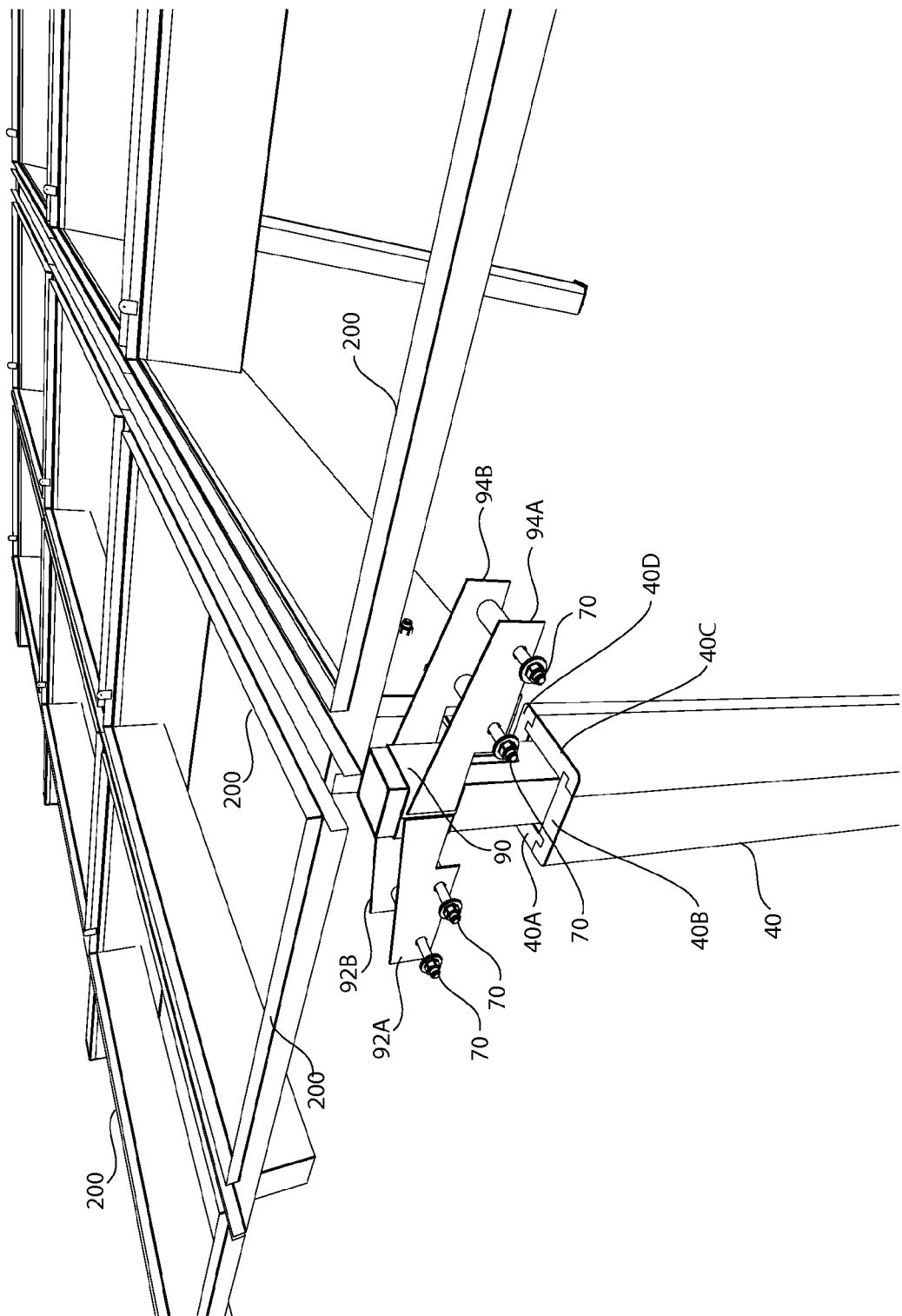
Figure 12:
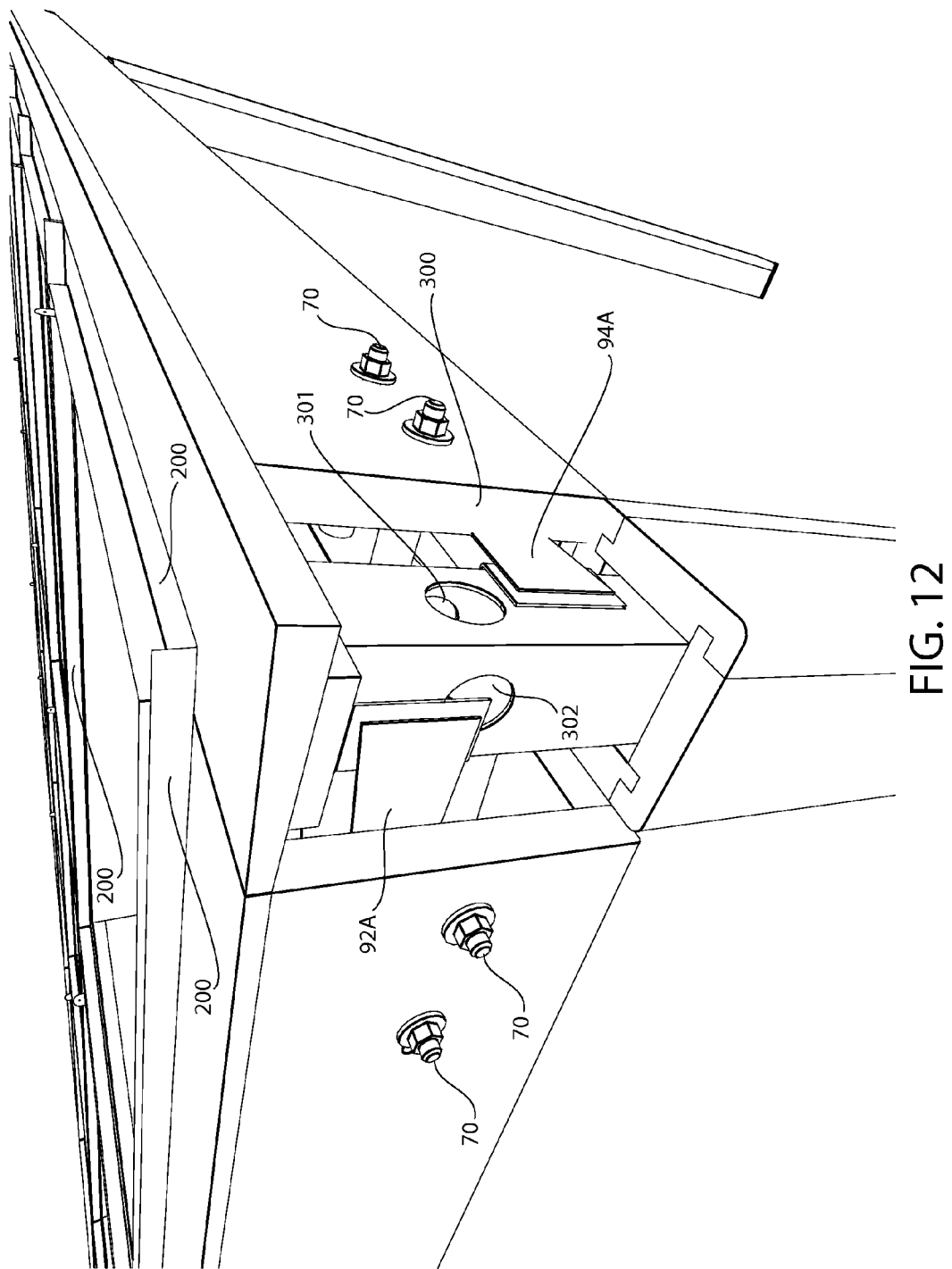
Figures 14A, 14B, 14C, 14D, 14E, 14F, 14G, 14H:
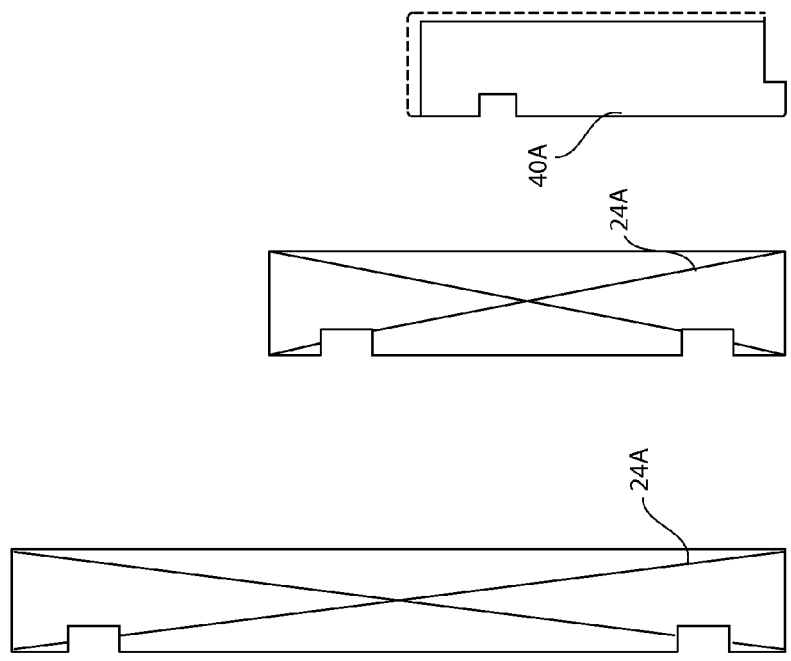
Figure 15A:
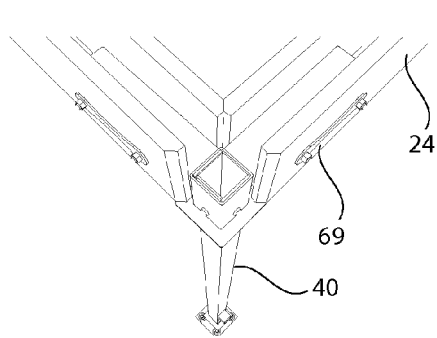
Figure 15B:
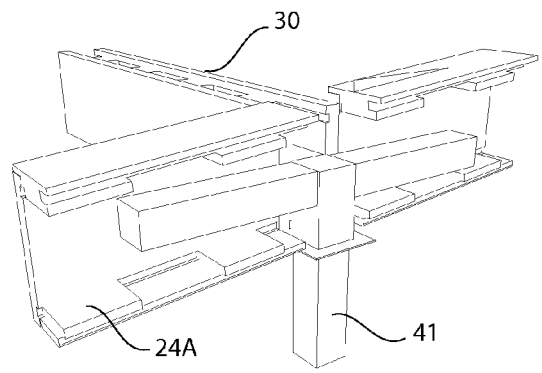
Figure 15C:
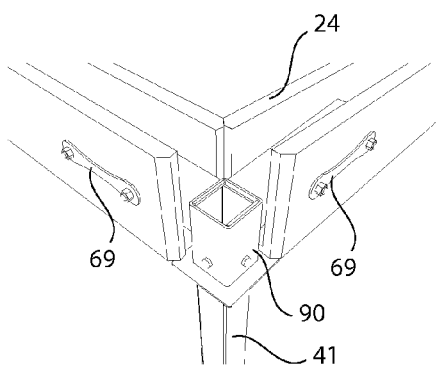
Figure 15D:
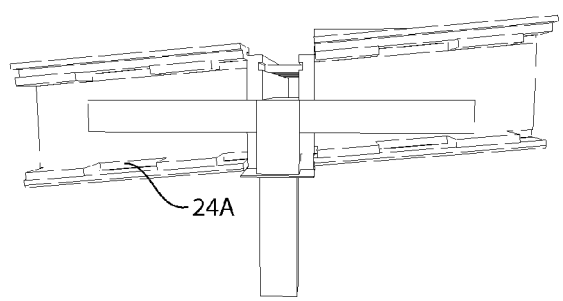
Figure 15E:
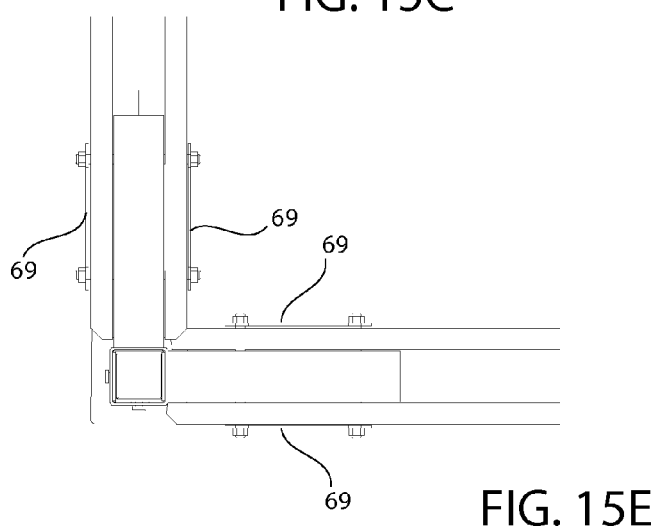
Figure 16:
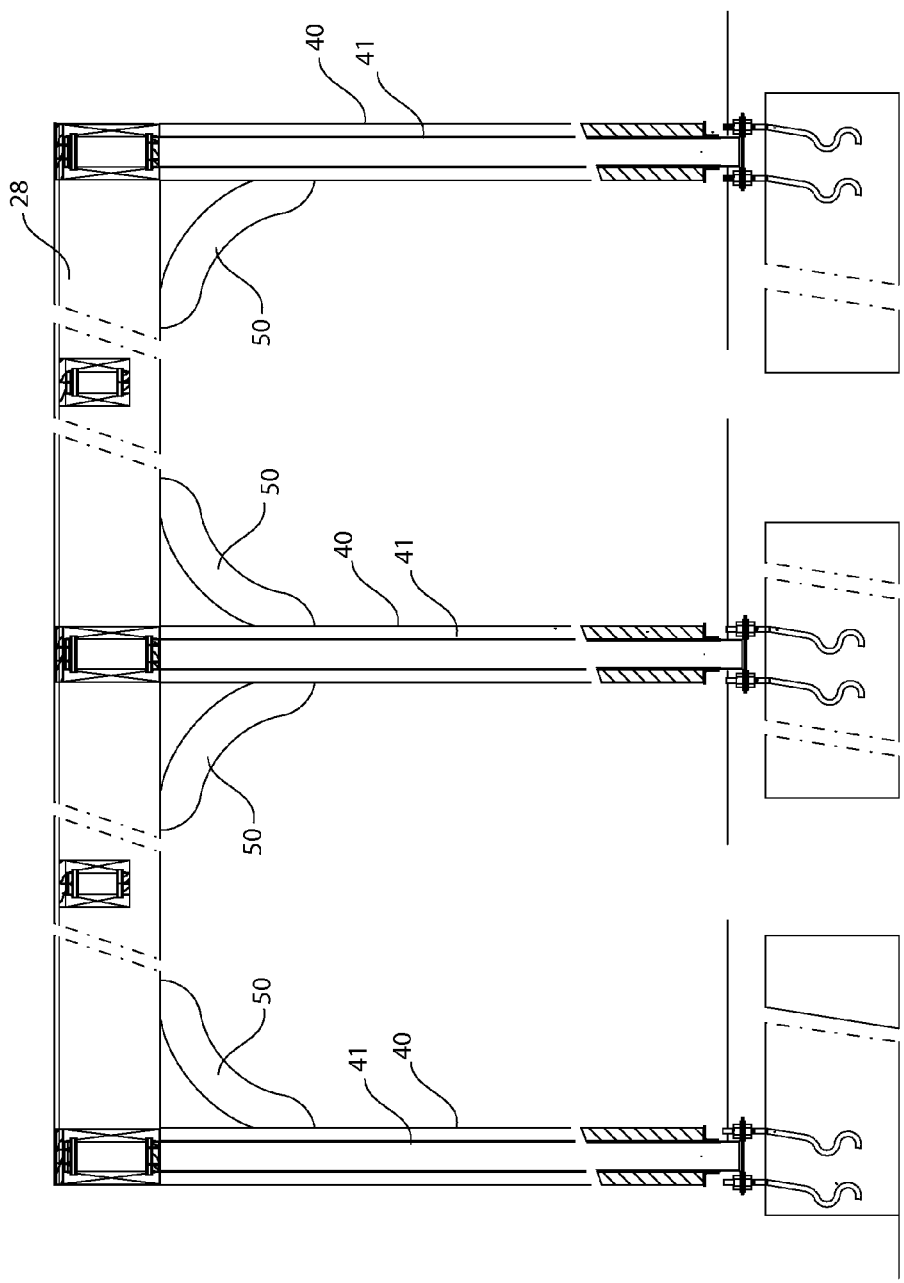
Figure 17:
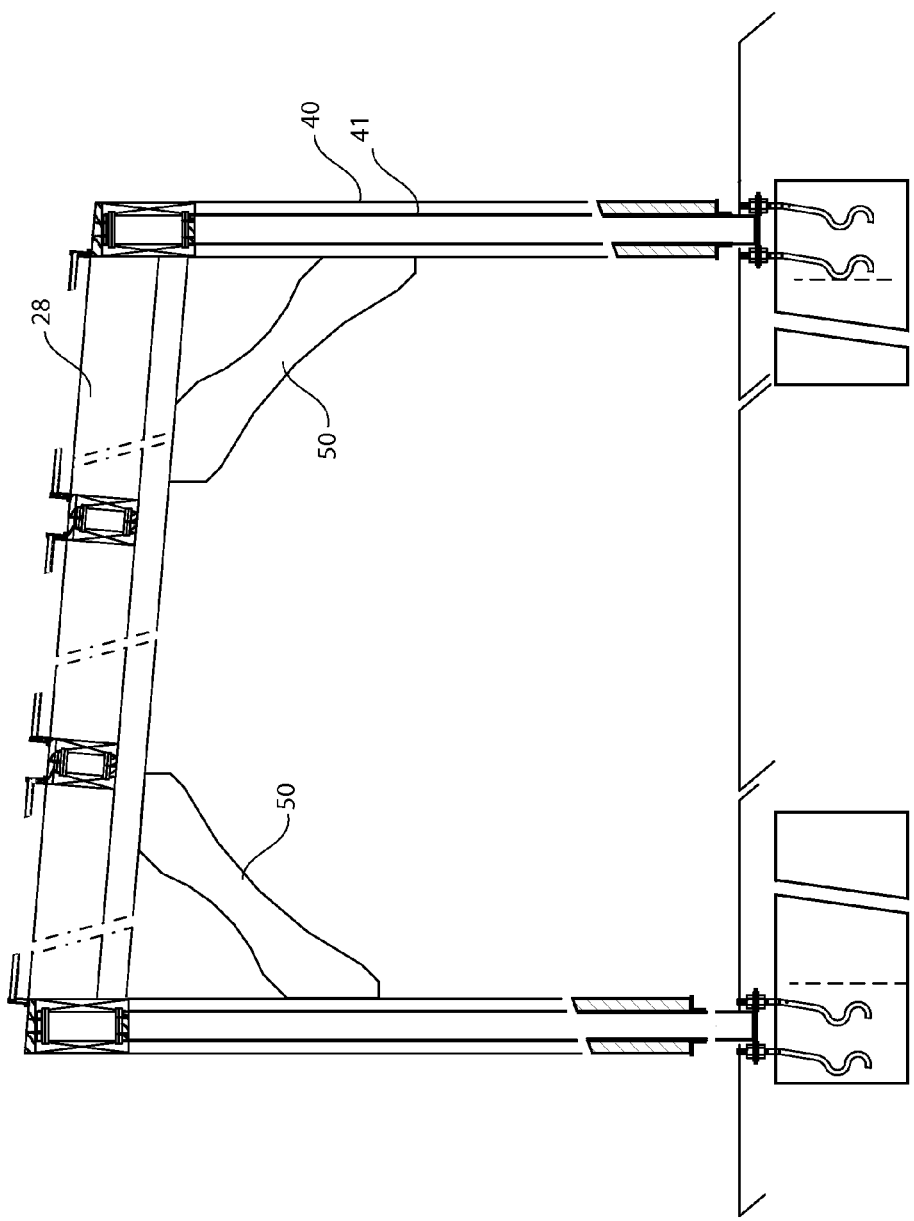
Figure 19:
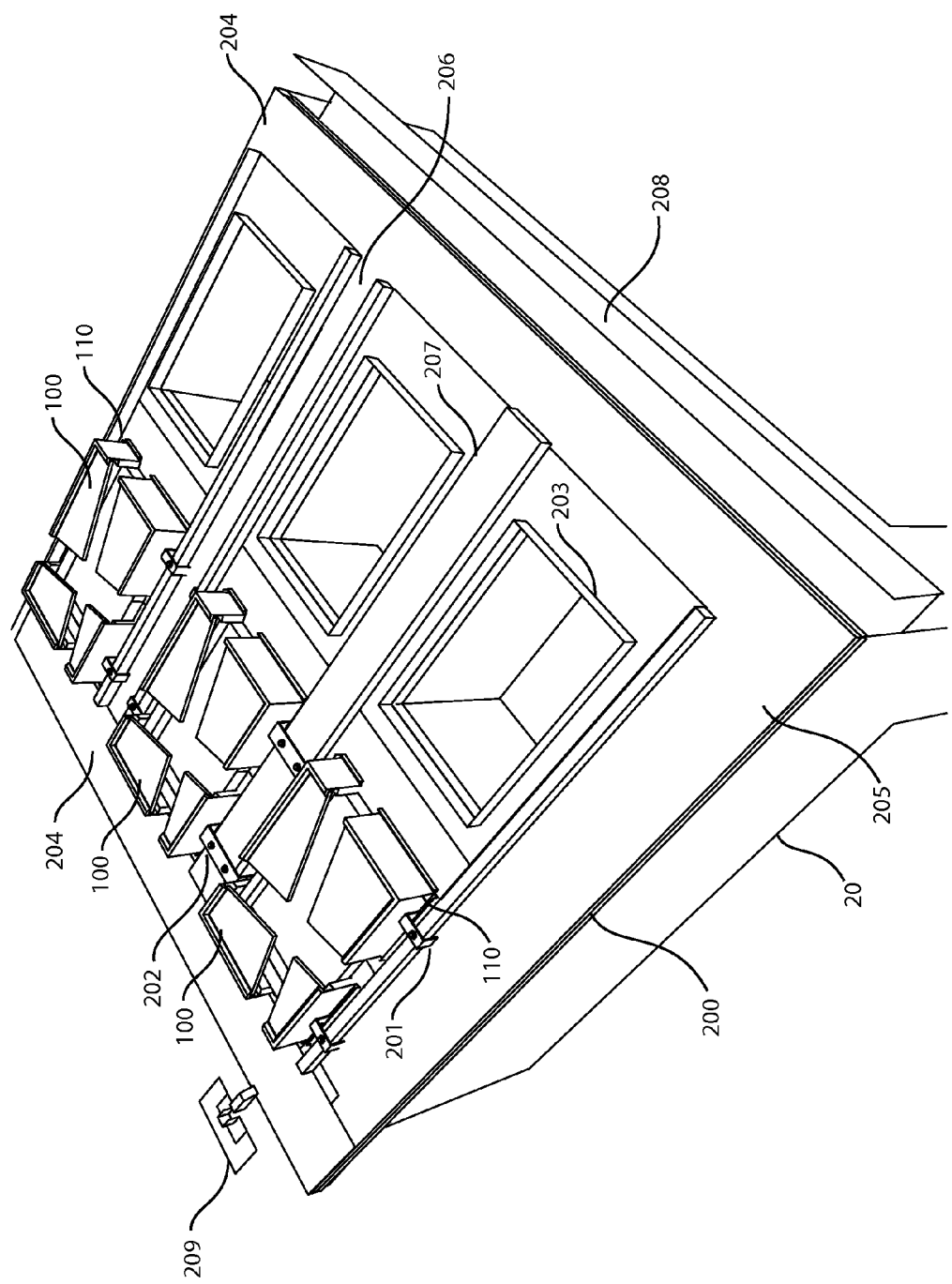
Figure 20A:
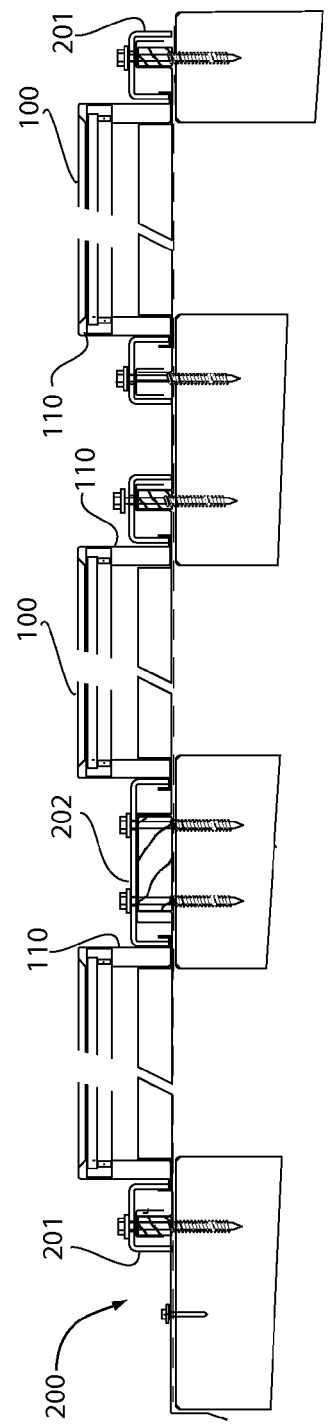

FIG. 8A-8C each shows an embodiment of a joining brackets that in accordance with the invention can be used to join the columns of FIG. 7 to the frame;

FIG. 9A-9C shows alternative views of connecting joints that in an embodiment can be used to join the frame and the support columns;

FIG. 10A-10D shows alternative views of connecting joints that in another embodiment can be used to join the frame and the support columns;

FIG. 11 shows connecting joints including a central hub in context of a corner where the frame and column join;

FIG. 12 shows an alternative embodiment of connecting joints including a central hub in context of a corner where the frame and column join;

FIG. 13A-D show details of hollow beam construction of an embodiment in accordance with the invention, FIG. 13E shows an embodiment of hollow column construction;

FIG. 14A-14H shows details of hollow beam construction of an alternative embodiment in accordance with the invention;

FIG. 15A-E shows alternative views of hollow beam construction of an embodiment in accordance with the invention in context of connection to the support frame;

FIG. 16 shows a cross section detailed view of an embodiment of the invention supported by tubular metal columns wherein the columns are sheathed in wood;

FIG. 17 shows an alternative detailed view of an embodiment of the FIG. 16 supported by tubular metal columns wherein the columns are sheathed in wood;

FIG. 18 shows a detailed view of the columns of FIG. 17;

FIG. 19 shows a partial cutaway perspective view of an embodiment in accordance with the invention of a water-resistant sub-assembly for supporting the PV panels on the frame;

FIGS. 20A and B show alternative views of the embodiment of FIG. 19.

Figure 21A:
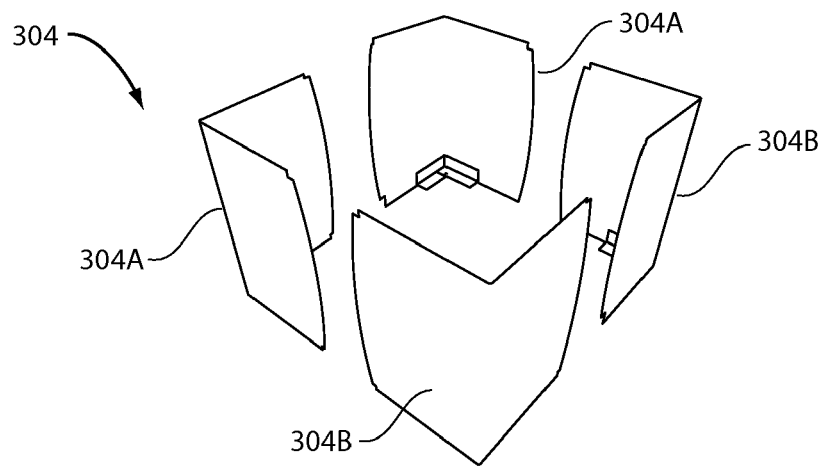
Figure 21B:
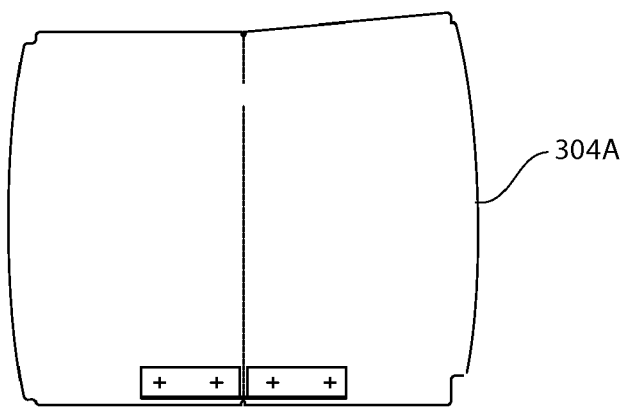
Figure 21C:
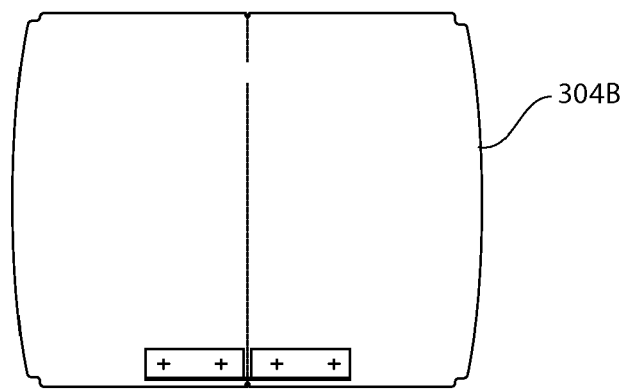
Figure 22:
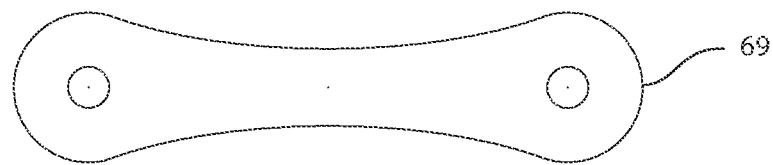

FIG. 21 shows a protective cap for covering corner joints in accordance with principles of the invention; and FIG. 22 shows details of a dog bone washer used in FIG. 9.

Figure 23A:
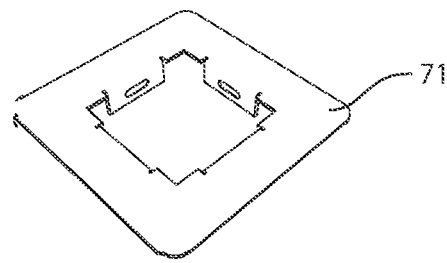
Figure 23B:
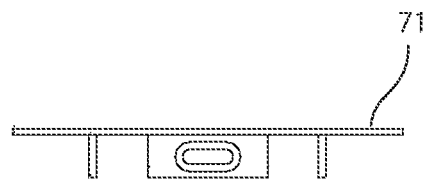
Figure 23C:
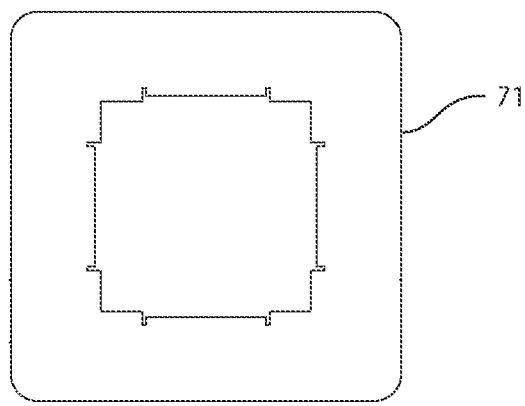

FIG. 23A-C shows an embodiment of and column collar used in FIG. 9.

DESCRIPTION

A solar power structure and a kit for making the same are provided. Hollow wood beams coupled to internal metal joints provide structural support and hold two or more PV panels, which are further supported by a unique, weather-resistant support assembly. The frame is readily mounted to a plurality of columns or posts, and is either free-standing (horizontal or sloping), or attachable to another structure as a lean-to.

Figure 1:
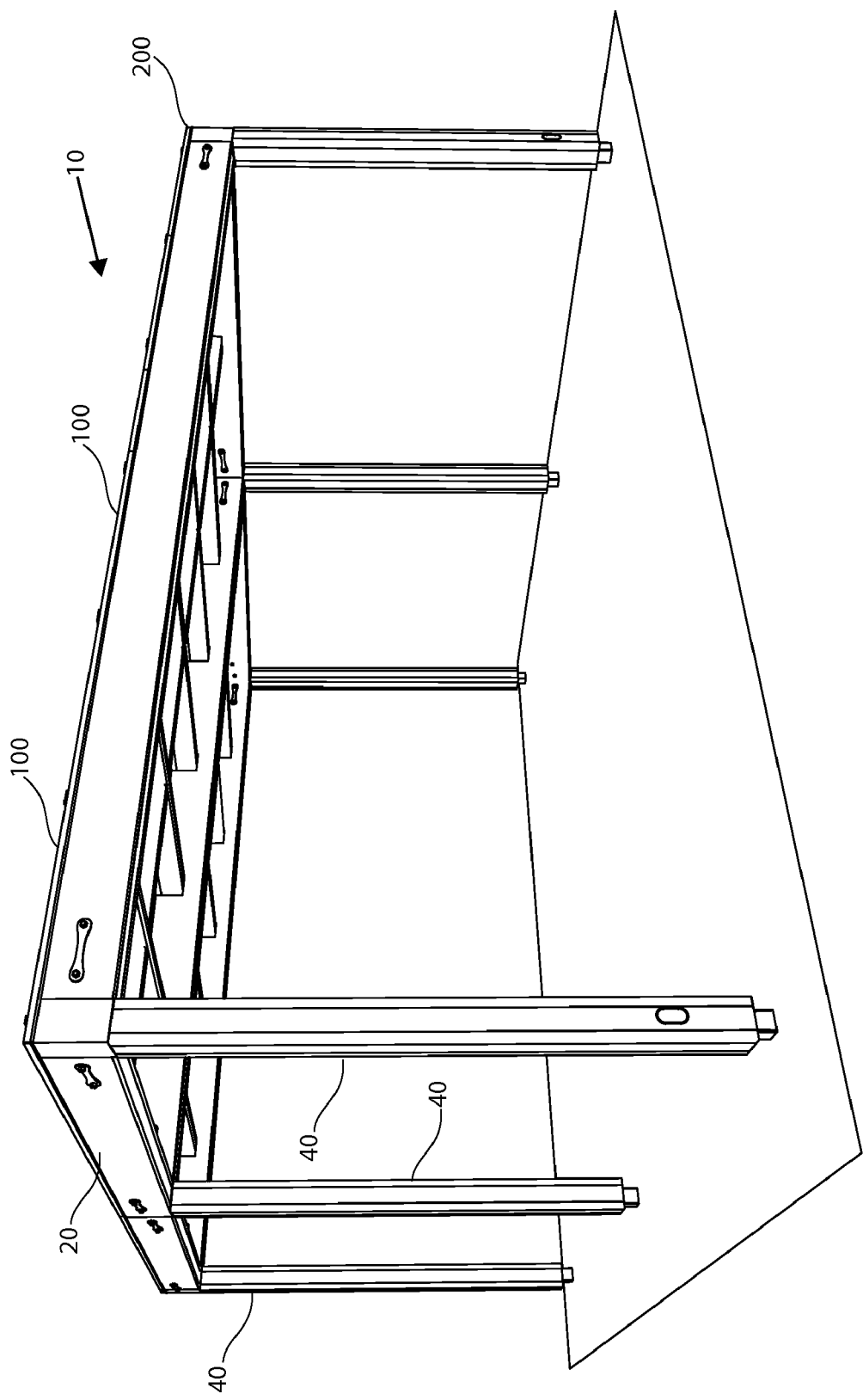
FIG. 1 illustrates one embodiment of a solar power structure according to the invention.
Figure 2A:
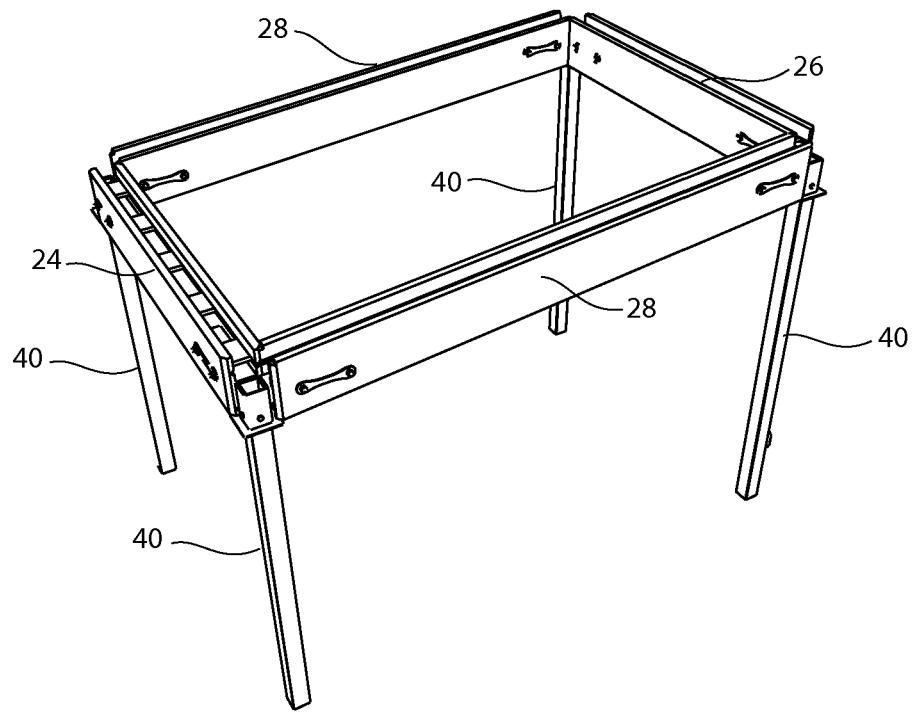
FIG. 2A-2D illustrates an embodiment of the frame in accordance with the invention including front, back, side, center beams, and cross beams.
Figure 2B:
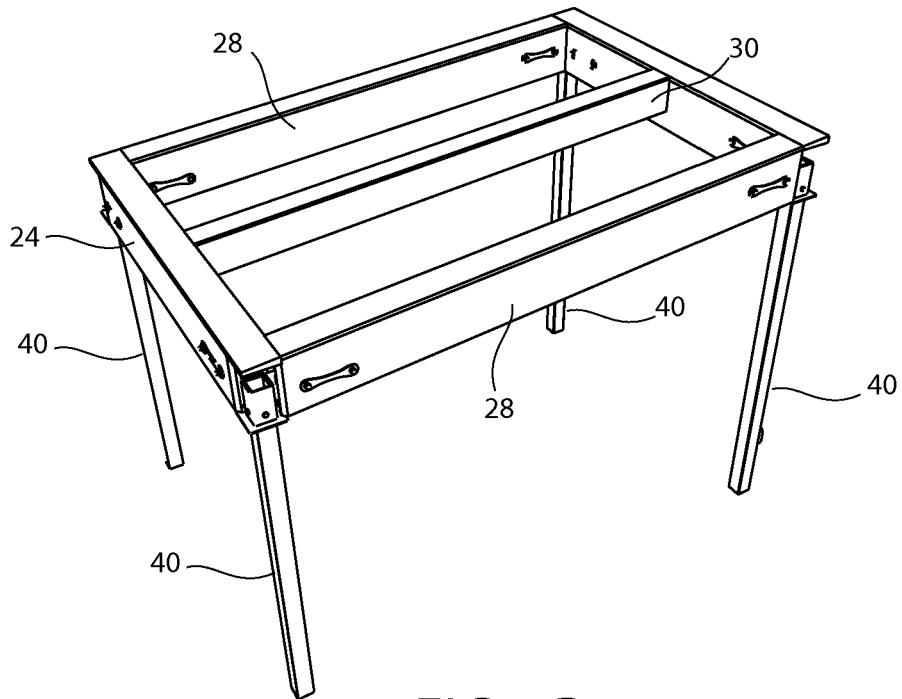
Figure 2C:
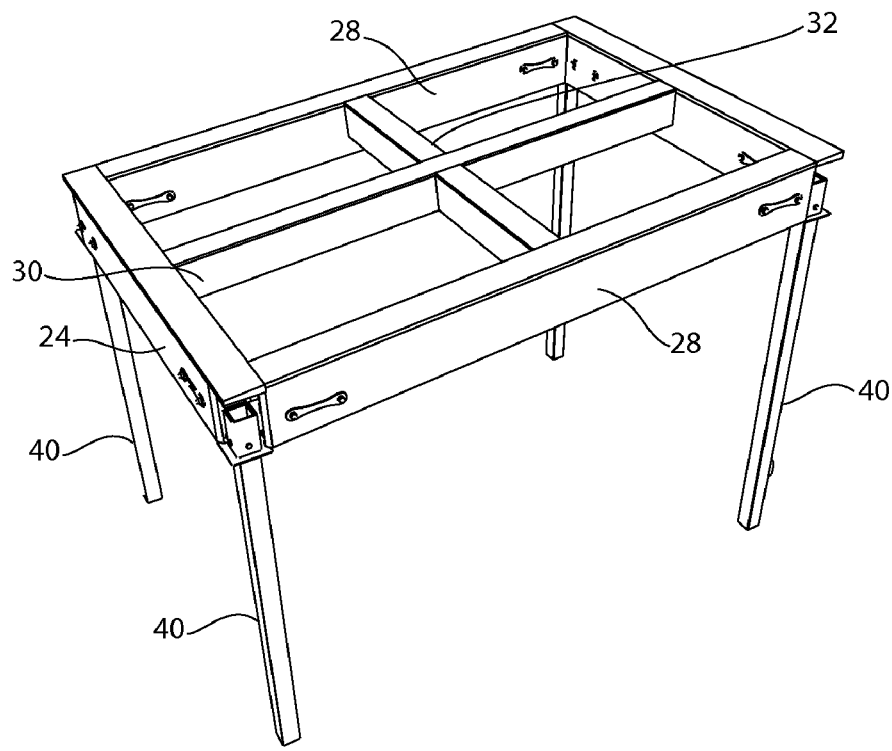
Figure 2D:
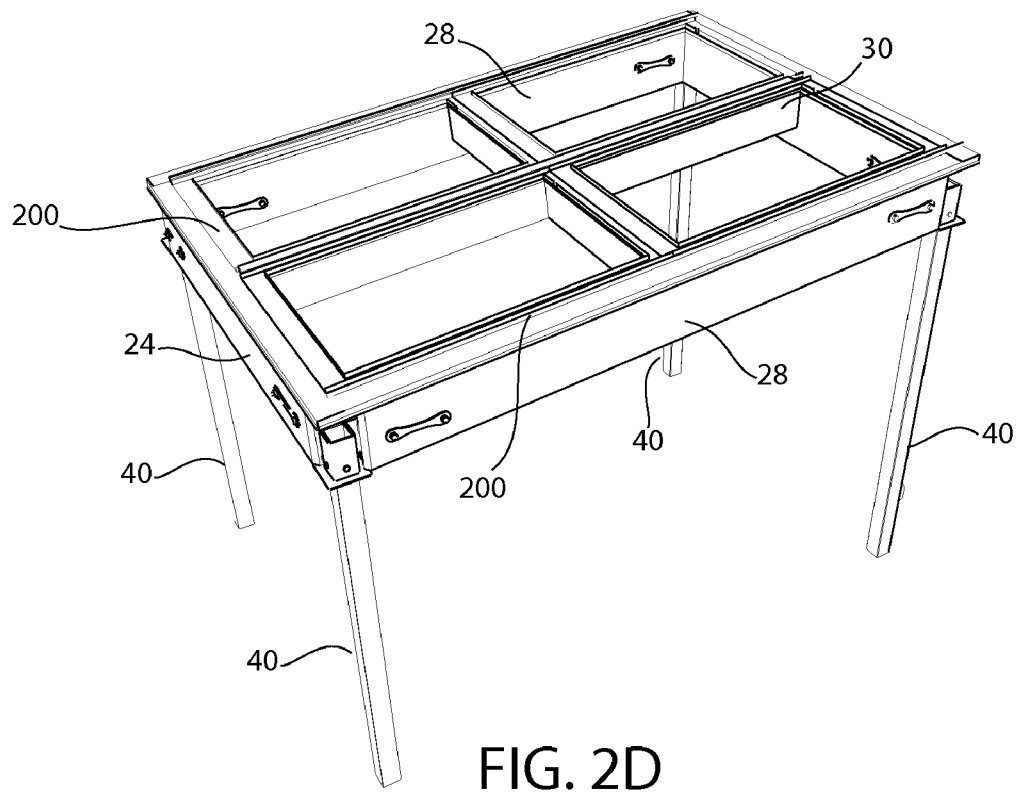
Figure 3:
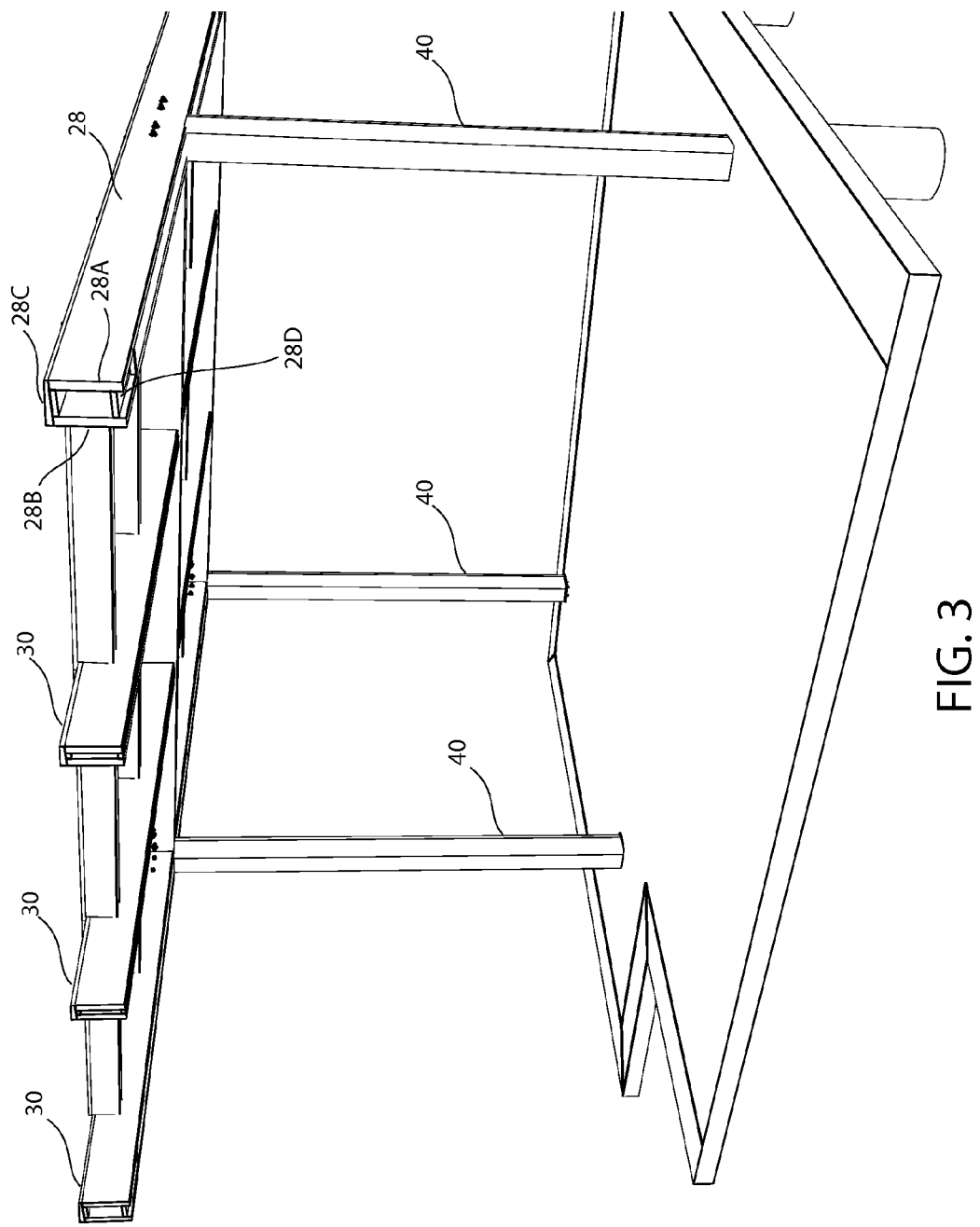
FIG. 3 illustrates a cut-away view of an embodiment of the frame revealing hollow construction of several beams.
Figure 4A:
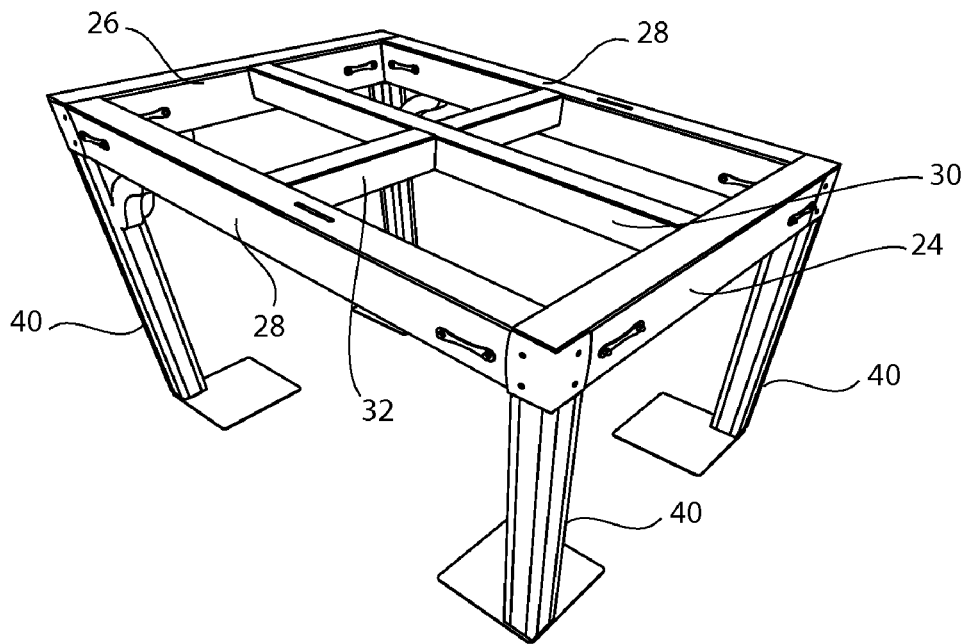
FIG. 4A-4D illustrates another embodiment of the frame in accordance with the invention including front, back, side, center beams, and cross beams.
Figure 4B:
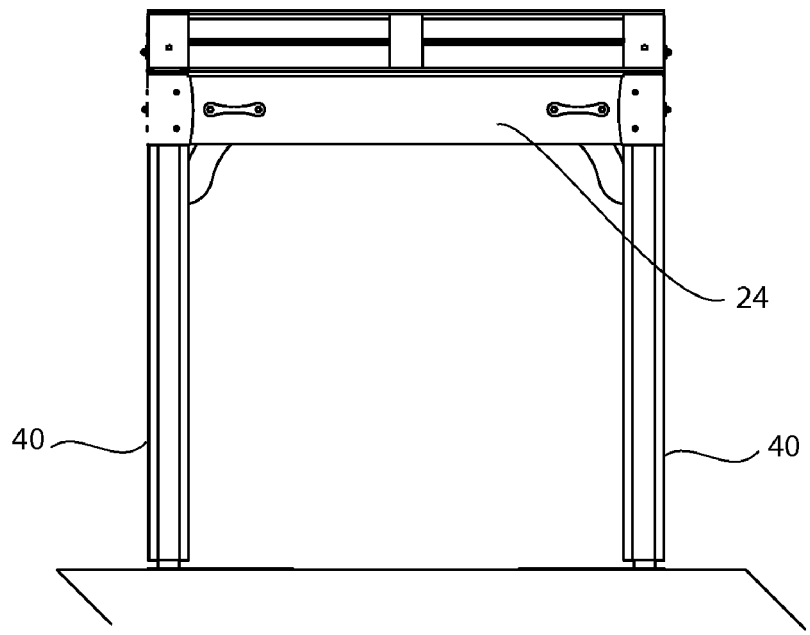
Figure 4C:
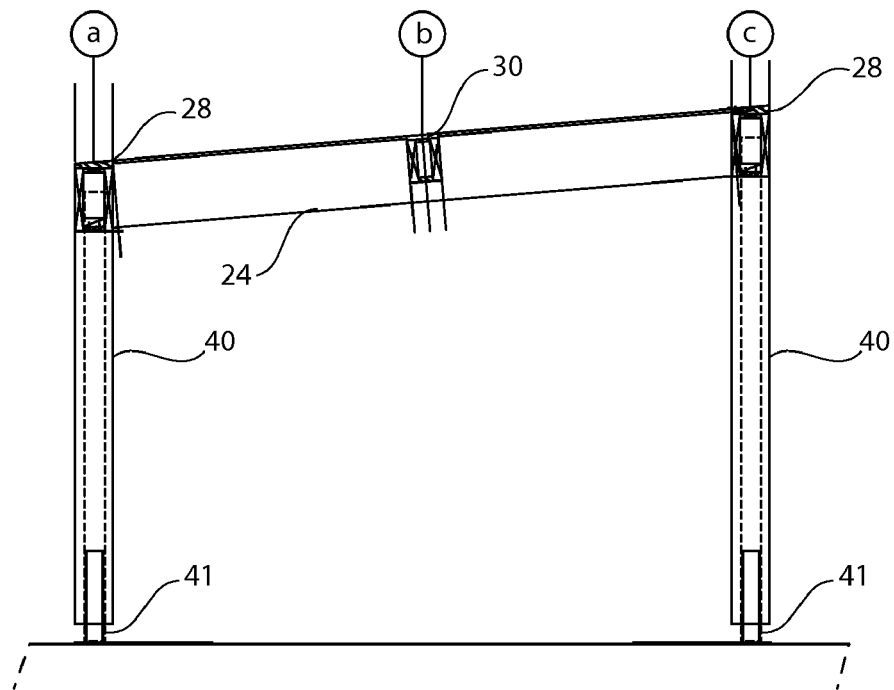
Figure 4D:
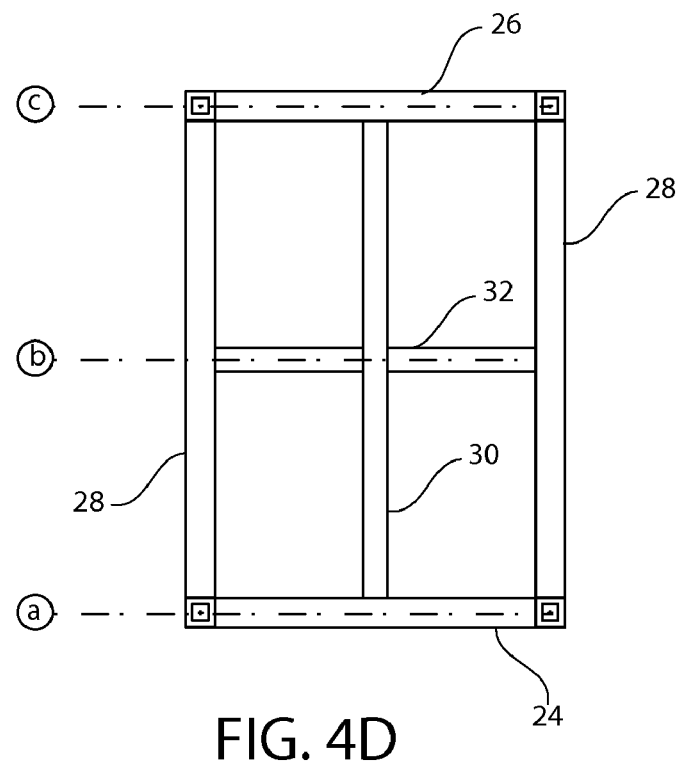
Figure 5A:
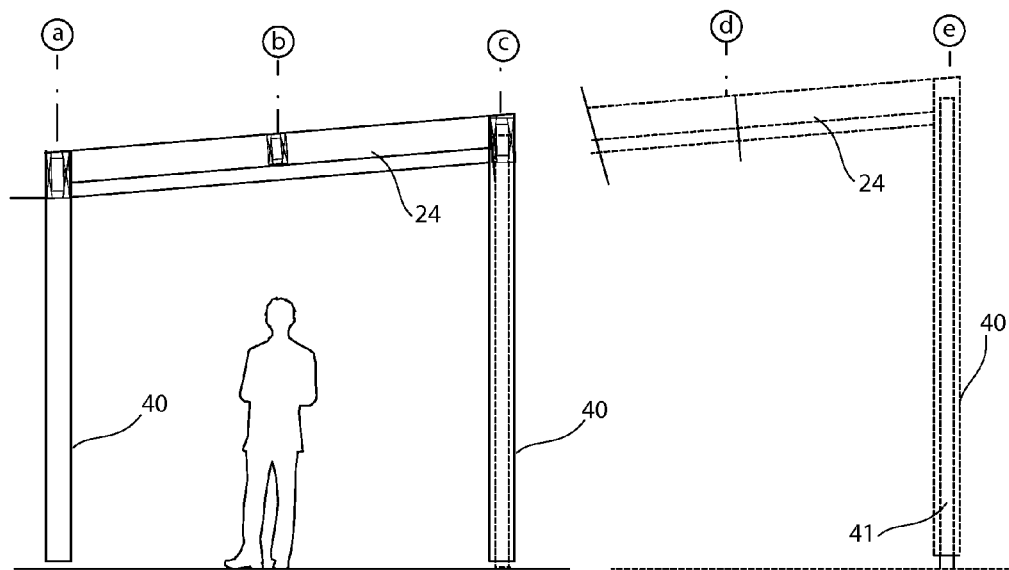
FIGS. 5A and 5B illustrates an embodiment of the frame in accordance with the invention in which the frame includes front and back beams, five transverse beams, and one interior beam.
Figure 5B:
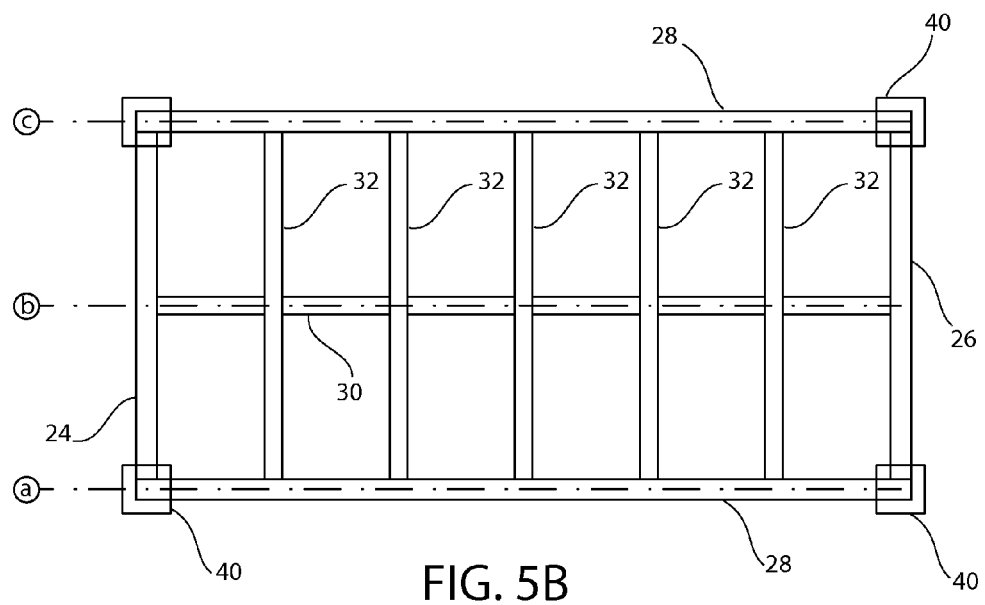
Figure 6A:
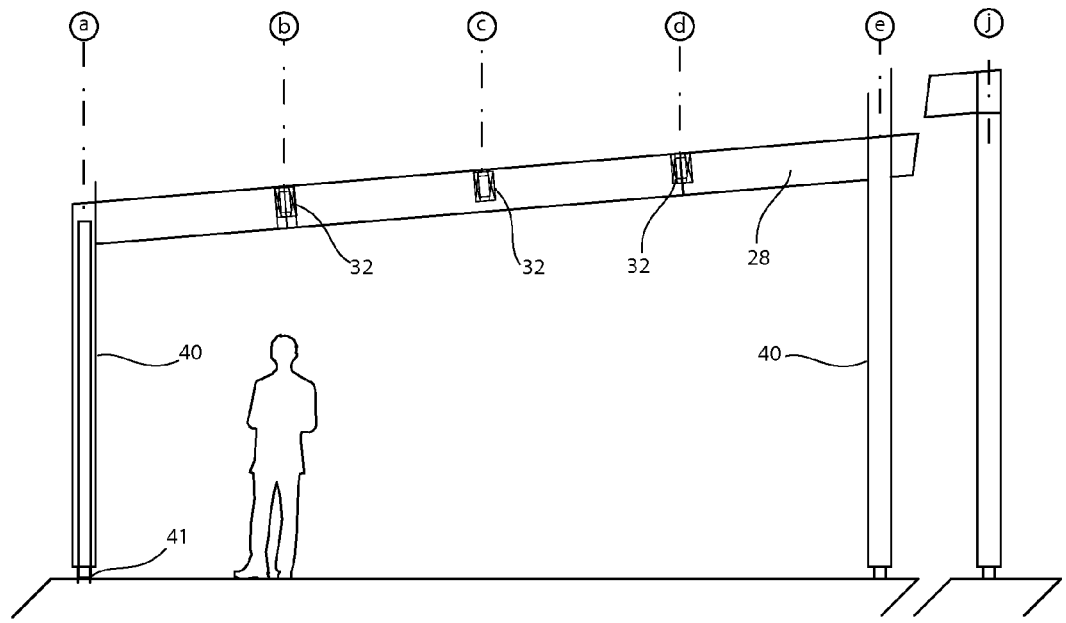
FIGS. 6A and 6B show an alternative embodiment of the frame in accordance with the invention where a grid of PV panels can be held by the front, back, side, and center beams, and cross-beams.
Figure 6B:
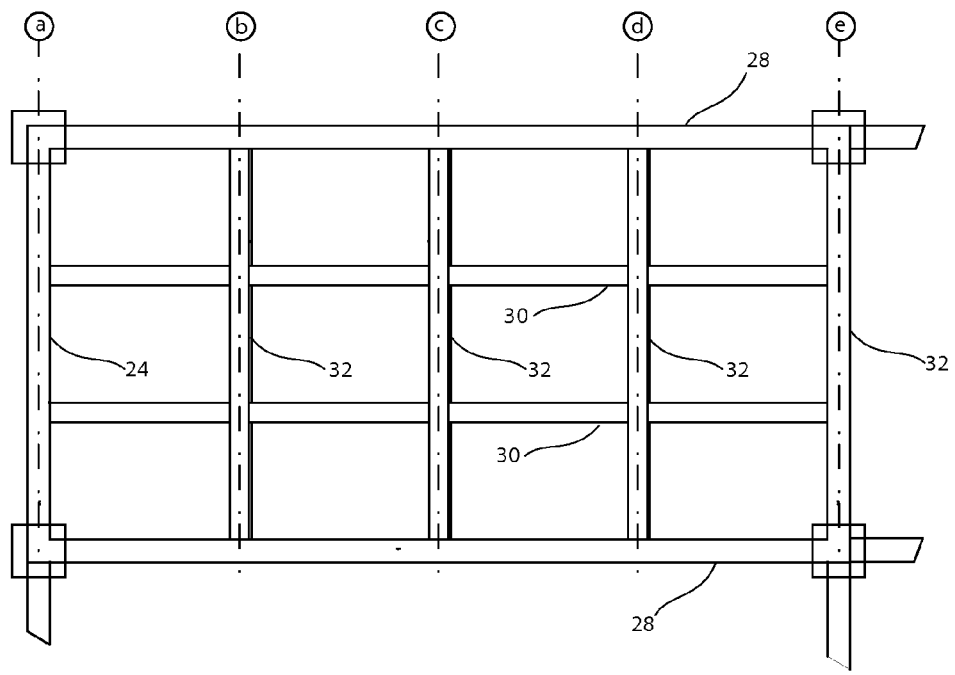

Referring now to the drawings in detail wherein like numerals indicate like elements throughout the several views, FIG. 1 illustrates one embodiment of a solar power structure 10 according to the invention. The solar power structure 10 has a frame 20, a plurality of columns 40, and a plurality of PV panels 100, which are supported by a water-resistant sub-assembly 200.

FIG. 2-6 illustrate various embodiments of the frame 20. As shown in FIG. 2A-2D and FIG. 4A-4D, the frame 20 has front beams 24 and back beams 26, side beams 28, center beam 30, and two "purlins" or cross-beams 32. Such a structure will hold four PV panels 100. FIG. 2D also shows a water-resistant sub-assembly 200 attached to the frame 20. In this embodiment, the water-resistant sub-assembly 200 follows the approximate shape of the frame 20 so as to leave an opening that exposes the bottom side of the PV panels 100. FIGS. 5A and 5B illustrate an embodiment in which the frame 20 has front beam 24 and back beam 26, five transverse beams 32 and one interior beam 30. The structure will hold twelve PV panels 100 (6 wide×2 deep). FIGS. 6A and 6B show another embodiment in which a grid of twelve PV panels 100 (3 wide×4 deep) can be held by the front beam 24, back beam 26 (not shown), side beams 28, center beams 30, and nine cross-beams 32. Other embodiments, for example, including 4 wide×4 deep, 4 wide×5 deep, 6 wide×3 deep, are also possible.

Each of the beams has a hollow construction, resulting from two, three, or four pieces that are joined together, using fasteners and/or glue. (Alternatively, in some embodiments, the interior beam(s) and/or cross-beams are solid.) This is illustrated, for example, in FIG. 3. Side beam 28 has a first side piece 28A, second side piece 28B, top piece 28C and bottom piece 28D; these are spaced apart by a number of transverse spacers (not shown). The hollow beam construction is described below in greater detail.

Like the beams used to build the frame 20, in one embodiment of the invention the columns 40 also are hollow. As shown in FIG. 7, column 40 is formed of four pieces, 40A-40D which define a hollow interior. The four sides can be joined together in a number of ways. In the embodiment shown, they have tongue and groove joinery that allows them to fit together snugly. Alternatively, other joinery techniques can be utilized. Additionally, or in the alternative, glue and/or nails, screws, or other fasteners can be used to join the four sides to make a hollow beam column 40.

In one embodiment, the hollow-beam columns 40 intrinsically possess the load-bearing capacity needed to support the frame 20. Again, referring to FIG. 7, alternatively, the columns 40 are merely decorative and nest around a load-bearing steel or other metal post 41, which can be tubular (e.g., square cross-section.) or solid. In another embodiment, the hollow-beam columns 40 act in concert with an internal metal post 41 to bear the load of the frame 20. Referring to FIG. 7, optionally, one or more brackets 50 are attached to the frame 20 and the columns 40, and provide added structural support. FIG. 8A, FIG. 8B, FIG. 8C each illustrate an embodiment of support bracket 50.

FIGS. 9 and 10 illustrate the connecting joints 60 and 80 used to connect various portions of the frame 20 and the support columns. FIG. 9A shows a plan view, FIG. 9B shows a side elevation, and FIG. 9C shows a perspective view. Similarly, FIG. 10A shows a plan view, FIG. 10B an elevation to inside view, FIG. 10C a perspective view, and FIG. 10D a side elevation view. The connecting joints (sometimes called "spider joints") include corner pieces 60 and interior or "T"-pieces 80. In a preferred embodiment, each of the connecting joints is made of steel and has a tubular, square cross-sectional design. As shown in FIG. 9A-9C, the corner pieces 60 have left arm 62 and right arm 64, a central hub 66, and a lower cap 68. A number of holes are drilled in the left arm 62, right arm 64, and hub, into which threaded bolts 70 can be inserted and secured by, e.g., "dog bone" washers 69, (see FIG. 22) and threaded nuts 70. This allows the hollow wood beams/columns to be secured to the connecting joints. Alternatively, nails or other fasteners are employed. Each arm supports a corresponding part of the frame 20, e.g., a front beam 24, rear beam 26, or side beam 28. The lower cap 68 also provides a surface upon which the exterior piece of a beam can rest.

Similarly, the "T"-framing joints (FIG. 10A-10D) have left 82, right 84, and middle 86 arms, a hub 88, and a lower cap, 87. The arms and hub are secured (by e.g., threaded bolts 70, washers, and nuts) to a corresponding portion of the wood frame 20, i.e., front beam 24 or back beam 26, interior beams, etc. The lower cap 87 also provides a surface upon which an exterior piece of a beam can rest.

In an alternative embodiment, the connecting joints have a slightly different construction. As shown in FIGS. 11 and 12, a connecting joint has a central hub 90, to which are welded non-tubular arms 92A, 92B, 94A, 94B, having the structure shown. Threaded bolts 70 or other fasteners extend through metal conduits linking the front A and back B of each arm, allowing the framing to be mounted thereto. FIG. 11 and FIG. 12 show a partial view of the weather-resistant sub-assembly 200 mounted above the frame 20. Both FIG. 11 and FIG. 12 illustrate the weather-resistant sub-assembly 200 configured in combination with the frame 20 so that a substantial portion of the bottom surface (or surface facing the ground) of the PV panel 100 is exposed and viewable from below the frame 20.

FIG. 13-16 illustrate additional details of the hollow beam construction of one embodiment of the frame 20 and supporting columns 40. For example, FIG. 13A illustrates a hollow beam core, which in an embodiment, forms a front beam 24. The hollow beam core has a first side piece 24A, and a second side piece 24B, a flat or sloped top cap 24C, a bottom piece 24D ("removable fascia"), and a plurality of transverse pieces or spacers 24E, the latter fitting into long dados cut into the first side piece 24A and second side piece 24B. (See also FIGS. 13B-13D, 15, and 16). This provides a very strong frame 20 and allows for a number of decorative variations. For example, the top piece 24C, bottom piece 24D, and/or first side piece 24A and second side piece 24B of each beam can be made of different types of wood, e.g., oak, redwood, pine, teak, etc., allowing for a number of different and distinctive appearances. FIGS. 7 and 15, for example, depict an embodiment in which the top pieces are redwood, and the side pieces are a different wood. Additional construction details are shown in FIGS. 14A-14H and 15. FIG. 14A shows one embodiment of top cap 24C with a sloped top, FIG. 14B and FIG. 14C show alternative embodiments of the top cap 24C with a flat top. FIG. 14D and FIG. 14E show two embodiments of bottom piece 24D. FIG. 14E and FIG. 14F show alternative embodiments of the side piece 24A. FIG. 14H shows a typical embodiment of one piece 40A of four wood pieces can be joined to form a hollow column or sheathing around the column 40. Note that, in FIG. 15A-E, the corner connecting joints can fit snuggly over a tubular metal post 41, which can be sheathed in wood pieces 40A-40D, see FIG. 13E.

FIGS. 16-18 provide additional details of one embodiment of the invention in which the frame 20 is supported by tubular metal columns 41 which are sheathed in wood, and one manner of mounting the columns 40 to a surface. In addition, FIG. 18 illustrates a port 55 in a tubular metal column 41; the port 55 provides access to the wiring hidden in the frame 20 and column(s) 40. As shown, nut and bolt fasteners can be secured through the exterior beam pieces, framing joints, and interior beam pieces, and held in place with dog bone washers. Similarly, the support columns 40 can be joined to the frame 20 using bolts or other fasteners. Alternatively, if the columns encase an interior steel frame, the steel frame can be welded to the framing joints.

The PV panels 100, and the sub-assembly 200 for supporting them, are important features of the invention. Although a number of PV panels 100 are commercially available, it is particularly preferred to use a translucent panel that allows some light from above to pass through the panels to the space beneath the frame 20. In one embodiment, a bifacial PV panel is used. A particularly preferred panel is the Sanyo model-200 Bifacial Panel from Sanyo Electric Co., Ltd. This panel is translucent and highly efficient, using HIT double technology. When light from the sun hits the panel, it starts producing energy like most solar panels do, from the top surface. But it also lets some light through, and then recycles it from the bottom side of the panel, adding another 15 to 20% to the CEC-rated production. This provides improved efficiency, economics, and environmental benefit.

Figure 20B:
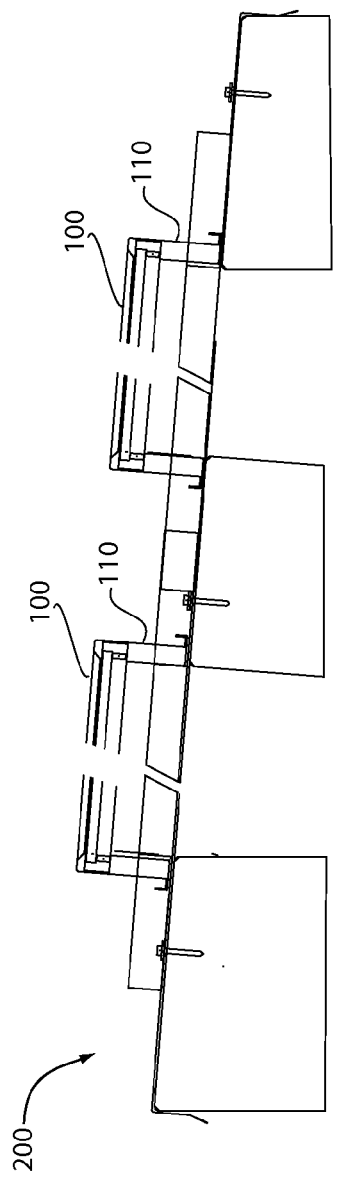

FIG. 19-20 illustrate one embodiment of a sub-assembly 200 for supporting the PV panels 100 on the frame 20. In FIG. 19, a partially cut-away view of a sub-assembly 200 on a frame 20 is shown with six PV panels 100, three of which are shown; the other three being omitted for clarity. The PV panels 100 are partially cut away to illustrate other features of the sub-assembly 200. In this embodiment, a plurality of single PV panel clips 201 and twin PV panel clips 202, PV panel flashing collars 203, formed flashing 204-207, and gutter 208 collectively provide a weather-resistant cladding that directs water away from the PV panels 100 and the frame 20. A notched, standing seam end cap 209 is also provided. Exposed seams at the interface between two or more metal pans (flashing) are weather-proofed by covering the seams with single or twin PV panel clips 202 and/or other flashing. FIG. 20 provides additional detail, with fasteners (extending through the various panel clips, standing seam caps, and other parts of the cladding, into the underlying beams. By using solid purlins (cross-pieces), the sub-assembly 200 can easily be securely fastened to the wood frame 20. Alternatively, hollow beam construction purlins can be used, with appropriate selection of fasteners.

Referring to FIGS. 11, 12, and 19, the weather-resistant sub-assembly 200 is configured so that a substantial portion of the bottom surface (surface facing the ground) of each PV panel 100 is viewable from below.

As shown in FIGS. 19 and 20, the PV panels 100 are slightly elevated above the weather-resistant sub-assembly 200 by risers 110. Essentially, the flashing 204-207 and flashing collar 203 form a pan around each of the PV panels 100, which diverts rain water away from the panels to the gutter 208, where it can be channeled through a down spout (not shown) and away from the structure. Collectively, the flashing, collars, and ancillary hardware provide a weather-resistant cladding that protects the electrical conduits connectors and other sensitive parts, as well as the frame 20. In some embodiments, asphalt water-proofing, bituminous sheet water proofing, etc., is also provided adjacent to and/or underneath or above the flashing, gutter 208, and other parts, to improve the overall water-resistance of the structure.

The electrical wires and other connectors are hidden within the frame 20 and protected from weather, yet they can be accessed at various places in the structure. For example, at the corners of the structure, where a front beam 24 and a side beam 28 meet, a corner opening 300 is provided, (see FIGS. 7 and 12). This allows access to apertures 301 302 in the metal column or corner joint and the electrical conduits that may extend therein. A protective cap 304 can cover the opening. In the embodiment of FIG. 21A-C, protective cap 304 is formed from two pieces each of a first protective cap section 304A and a second protective cap section 304B. The decorative caps are made of aluminum or another suitable non-corrosive material, which can be painted. Similarly, port 55 in the tubular metal post 41, allows access to the wiring. Electrical components (e.g., charge controller, batteries, DC/AC inverter, etc.) are provided in a conventional manner. Advantageously, the wires and electrical connections are encased within the hollow beam frame 20 and are protected from the elements. This yields a highly durable, aesthetically pleasing solar power structure 10.

FIGS. 23A, 23B, and 23C illustrate side view, perspective view, and top view of column collar 71 used with an embodiment similar to the one shown in FIG. 9.

The invention also provides a kit for making such a structure. In one embodiment, the kit provides the PV panels 100, flashing, collars, seam caps, and ancillary hardware. In another embodiment, the kit also contains all of the framing elements (side, top, bottom pieces, etc.) needed to make the frame 20 and, optionally, the columns 40. In still another embodiment, the kit contains all components necessary to make a complete solar power structure 10, including the electrical components, PV panels 100, sub-assembly 200 for holding the panels, frame 20, and columns 40.

The invention provides a number of beneficial features, including the use of short steel-connecting joints ("spider joints"), unique framing interconnections; a wood frame 20 that reduces weight and removes the need for an electrical ground from that portion of the frame 20; a unique cladding to water-proof both the connection between the frame 20 and the solar panels, as well as the electrical wiring; use of a frame 20 to support the entire edge of the solar panel that both protects the edge and evenly distributes the load on the entire edge of the panel; easy removal of individual solar panels within the array after installation of the array; access to the under side of the solar panels for maintenance and cleaning; hollow beam construction with interior channels that hide the electrical wiring and components; and the configuration of multiple panels and interconnections that directs water away from the surface in a controlled manner and away from the electrical components.

A number of variations are possible, including different sizes, dimensions, shapes, and configurations, as well as different materials. For example, the frame 20 need not have a generally rectangular shape but, instead, can have a triangular, or even curved shape. Rectangular PV panels 100, of course, can be used in combination with a frame 20 having a curved outer perimeter. The invention is limited only by the claims and equivalents thereof.

What is claimed is:

1. A free-standing solar power structure, comprising:
a plurality of PV panels;
a frame for supporting the plurality of PV panels;
a plurality of support columns coupled to and extending beneath the frame;
a water-resistant sub-assembly mounted to the frame; and
the water-resistant sub-assembly is configured to secure the plurality of PV panels, expose for viewing from below the frame a portion of each PV panel bottom surface, and direct water away from the plurality of PV panels and the frame; wherein the water-resistant sub-assembly includes a flashing collar, formed flashing, a gutter; and the flashing collar, the formed flashing, and the gutter are configured to divert water away from the plurality of PV panels and the frame.

2. A free-standing solar power structure of claim 1, wherein the frame includes hollow beams each formed by joining a plurality of wood pieces.

3. A free-standing solar power structure of claim 1, wherein the plurality of support columns includes support columns that include:
 a metal support column;
 wood pieces; and
 the metal support column is surrounded by the wood pieces forming a sheath around the metal support column.

4. A free-standing solar power structure of claim 3, wherein the frame includes hollow frame beams each formed by joining a plurality wood pieces.

5. A free-standing solar power structure of claim 1, wherein:
 the flashing collar and formed flashing form a pan around each PV panel; and
 the pan is configured to divert water away from each PV panel to the gutter.

6. A free-standing solar power structure of claim 1, wherein the PV panels are elevated above the water-resistant sub-assembly by risers.

7. A free-standing solar power structure of claim 1, wherein the PV panels are elevated above the water-resistant sub-assembly by risers.

8. A free-standing solar power structure, comprising:
 a plurality of PV panels;
 a frame, configured to support the plurality of PV panels;
 the frame including hollow beams each formed by joined pieces of wood;
 a plurality of support columns attached to and extending beneath the frame; and
 each support column including a load-bearing metal post and a hollow-beam column, the hollow-beam column constructed from wood and nested around the load-bearing metal post; wherein the water-resistant sub-assembly includes a flashing collar, formed flashing, a gutter; and the flashing collar, the formed flashing, and the gutter are configured to divert water away from the plurality of PV panels and the frame.

9. A free-standing solar power structure of claim 8, wherein the hollow-beam column or the hollow beams includes removable fascia.

10. A free-standing solar power structure of claim 8, wherein the frame is configured so that a portion of each PV panel bottom surface is viewable from below.

11. A free-standing solar power structure of claim 10, wherein:
 the plurality of PV panels are coupled to a water-resistant sub-assembly mounted to and above the frame; and
 the water-resistant sub-assembly configured to so that substantial portions of each of the PV panel bottom surfaces are viewable from below.

12. A free-standing solar power structure of claim 11, wherein the water-resistant sub-assembly is configured to divert water away from the frame and PV panels.

13. A free-standing solar power structure of claim 12 further comprising:
 a plurality of electrical wiring and a plurality of electrical connectors routed through the hollow beams;
 an corner opening located at a corner joint of the frame for accessing a portion of the plurality of electrical wiring and the plurality of electrical connectors; and
 a protective cap configured to cover the corner opening and disposed to protect from water the portion of the plurality of electrical wiring and the plurality of electrical connectors.

14. A free-standing solar power structure of claim 8 further comprising:
 a plurality of electrical wiring and a plurality of electrical connectors routed through the hollow beams;
 a corner opening located at a corner joint of the frame for accessing a portion of the plurality of electrical wiring and the plurality of electrical connectors; and
 a protective cap configured to cover the corner opening and disposed to protect from water the portion of the plurality of electrical wiring and the plurality of electrical connectors.

15. A free-standing solar power structure, comprising:
 a plurality of translucent PV panels;
 a frame for supporting the plurality of translucent PV panels;
 a water resistant sub-assembly; and
 the water resistant sub-assembly, the frame, and the plurality of translucent PV panels are configured so that water is diverted away from the frame and the plurality of translucent PV panels and a portion of light from above the plurality of translucent PV panels passes through the plurality of translucent PV panels to an area beneath the frame; wherein the water-resistant sub-assembly includes a flashing collar, formed flashing, a gutter; and the flashing collar, the formed flashing, and the gutter are configured to divert water away from the plurality of PV panels and the frame; a plurality of support columns attached to and extending beneath the frame.

16. A free-standing solar power structure of claim 15, wherein each support column is constructed of metal and surrounded by a hollow wooden shell.

17. A free-standing solar power structure of claim 16, wherein the frame includes hollow beams each formed by joining a plurality wood pieces.

18. A free-standing solar power structure of claim 15, wherein the frame includes hollow beams formed by joining a plurality wood pieces.

* * * * *